Figure 1:
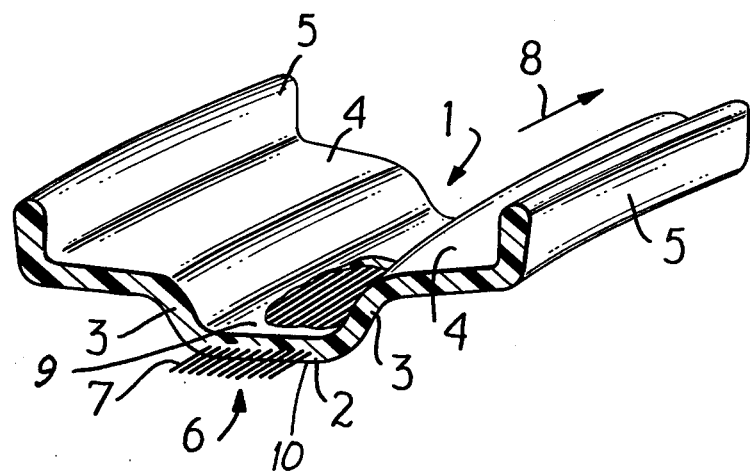

| United States Patent [19] | [11] | 4,146,274 |
|---|---|---|
| Lejeune | [45] | Mar. 27, 1979 |

[54] CIRCUMFERENTIALLY REINFORCED WHEEL RIMS OF MOLDABLE MATERIAL

[75] Inventor: Daniel Lejeune, Clermont-Ferrand, France

[73] Assignee: Compagnie Generale des Etablissements Michelin, Clermont-Ferrand, France

[21] Appl. No.: 730,782

[22] Filed: Oct. 8, 1976

Related U.S. Application Data

[63] Continuation-in-part of Ser. No. 557,648, Mar. 12, 1975, abandoned.

[30] Foreign Application Priority Data

Mar. 25, 1974 [FR] France ................................ 74 10202

[51] Int. Cl.² .......................... B60B 5/02; B60B 21/00
[52] U.S. Cl. ................................. 301/97; 301/63 PW; 301/65
[58] Field of Search ............. 301/63 PW, 63 R, 63 D, 301/63 C, 65, 95–97; 152/378, 396, 405, 357 A

[56] References Cited

U.S. PATENT DOCUMENTS

| 2,992,045 | 7/1961 | Martenet | 152/410 X |
| 3,369,843 | 2/1968 | Prew | 301/63 PW |
| 3,811,737 | 5/1974 | Lejeune | 301/63 PW |
| 3,917,352 | 11/1975 | Gageby | 301/63 PW |

FOREIGN PATENT DOCUMENTS

| 1275900 | 8/1968 | Fed. Rep. of Germany | 301/63 PW |
| 2101247 | 8/1972 | Fed. Rep. of Germany | 301/63 PW |
| 588782 | 6/1947 | United Kingdom | 301/97 |
| 1372357 | 10/1974 | United Kingdom | 301/63 PW |

*Primary Examiner*—Robert J. Spar
*Assistant Examiner*—Charles A. Marmor
*Attorney, Agent, or Firm*—Brumbaugh, Graves, Donohue & Raymond

[57] ABSTRACT

Wheel rims of moldable material for a tire having a base with a bead seat on each side extended by a flange are improved and strengthened against longitudinal tension stresses by having only in the base a tension-resistant embedded reinforcement solely formed by reinforcing elements arranged parallel to the circumferential direction of the rim.

3 Claims, 2 Drawing Figures

CIRCUMFERENTIALLY REINFORCED WHEEL RIMS OF MOLDABLE MATERIAL

This application is a continuation-in-part application of U.S. application Ser. No. 557,648, filed Mar. 12, 1975, now abandoned.

The present invention relates to improvements in wheels intended to be equipped with tires. More particularly, it relates to wheels made from moldable materials, such as light metal alloys, high polymers, or synthetic materials, having a relatively low modulus of elasticity.

The wheels and particularly the rims manufactured of such materials require a suitable reinforcement in order to last satisfactorily for a long period under the customary conditions of use of the vehicles.

In general, the moldable materials in question resist compression stresses well but do not resist tension stresses sufficiently. The result is that the reinforcement must be resistant primarily to tension stresses and arranged essentially in the region or regions of the rims which are subjected to considerable tension stresses.

As is well known a wheel rim, whether it consists of a single piece or of several pieces, comprises a base and, arranged on opposite sides of the base, a bead seat which is extended by a flange. The base is the part or element of the wheel rim which has the smallest radius with respect to the axis of rotation, particularly in the case of rims with a sunken base formed by a cylindrical bottom portion and two frustoconical sidewalls.

When a tire mounted on a molded wheel rim is pressurized, the rim is subjected to circumferential or longitudinal stresses. The two bead seats and the two flanges of the molded wheel rim are subjected to longitudinal compression stresses which the moldable material resists well without either longitudinal or transverse reinforcing elements, because these reinforcing elements have too low a resistance to compression stresses. However, the base of the molded wheel rim is subjected to longitudinal tension stresses, i.e., normal to the axis of rotation, against which the resistance of the moldable material is too low and against which it is also useless to provide transverse reinforcing elements.

The object of the present invention is to impart to wheel rims of moldable material a suitable resistance to the circumferential or longitudinal tension stresses occurring in the base of the moldable wheel rim.

In accordance with the present invention, the reinforced wheel rims of moldable material have a base, two bead seats, and two flanges and are characterized by the fact that only the base has a tension-resistant embedded reinforcement solely formed by reinforcing elements arranged parallel to the circumferential direction of the rim.

The molded wheels of the present invention can be made from a material which is moldable by any known process. The reinforcement or at least a part thereof is embedded in this material. The modulus of elasticity of the material or materials constituting the reinforcement is greater than the modulus of elasticity of the material constituting the rim of the wheel. Rims of moldable material reinforced in accordance with the invention comprise, for example, rims of light metal alloy or of synthetic resin with a reinforcement of cables of steel, glass fibers or carbon, etc.

Such a reinforcement may be constituted of elements such as wires, threads, strands, cords, or cables arranged in the form of plies and/or fabrics. However, the reinforcement may also comprise layers of felted materials obtained by embedding particles of any shape and dimension oriented or dispersed at random in a suitable material, the particles being made of materials which are at least resistant to tension.

In order to benefit from their resistance to tension, the elements of the reinforcement in the base of the molded wheel rim in accordance with the invention are arranged parallel to the circumferential direction of the rim.

In the case of a wheel rim with a sunken base, it is sufficient at times to limit the reinforcement in accordance with the invention to the cylindrical bottom portion of the base. In certain cases it may be indicated also to provide a reinforcement in accordance with the invention in one or the other or both frustoconical sidewalls bordering the bottom portion of the base. The invention is, as a matter of fact, applicable in the regions of the rim where there appear circumferentially directed tension stresses which may be injurious to the life of the moldable material or materials constituting the rim. In general, one of the two (upper and lower) faces of the base is more subjected to circumferential tension stresses than the other; it is therefore advantageous to arrange the reinforcement of the invention near that face.

The invention will be fully understood from the drawing which shows various embodiments thereof, without these embodiments being limitative.

Figure 2:
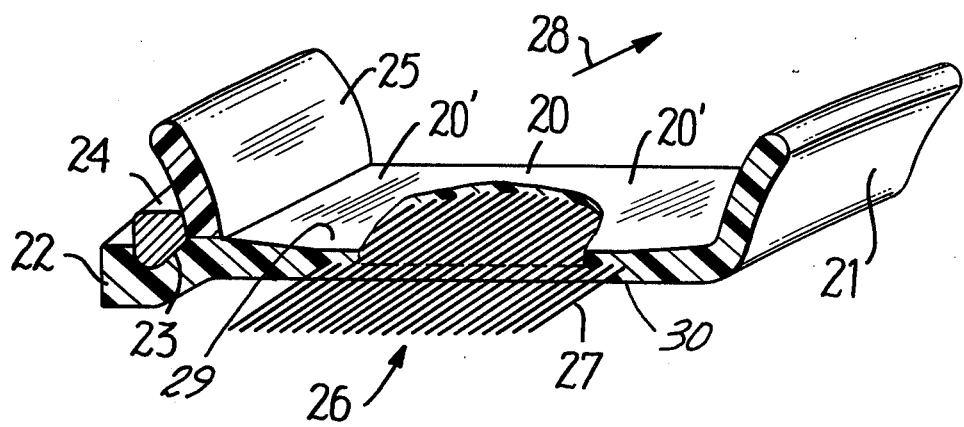

In the drawing:

FIG. 1 is a sector view, in perspective and partially broken away, of a single-piece sunken-base type rim provided with a reinforcement in accordance with the invention; and FIG. 2 is a sector view, also in perspective and partially broken away, of a flat-base type rim having a removable flange and provided with a reinforcement in accordance with the invention.

The rim shown in FIG. 1 is of the sunken-base type. As can be seen, the sunken base 1 with an upper face 9 and a lower face 10 is formed by a cylindrical bottom portion 2 and two frustoconical sidewalls 3. Two bead seats 4 terminated by flanges 5 laterally extend the base. In the cylindrical bottom portion 2 of the base, which is the element having the smallest radius of the assembly of parts constituting the rim, there is arranged a reinforcement 6 in accordance with the invention formed of reinforcement wires 7 which are arranged parallel to each other and to the circumferential direction of the rim indicated by the arrow 8.

In FIG. 2 there is shown a rim of the flat-base type. The base 20 with an upper face 29 and a lower face 30 is practically merged with the two bead seats 20' and is terminated on the one side by a stationary flange 21. On the other side the base 20 is terminated by a portion 22 of larger cross section. This portion 22 is provided with a groove 23 intended to receive the locking ring 24 for the removable flange 25. Embedded in the base 20 there is a reinforcement 26 in accordance with the invention. This reinforcement is formed of reinforcing wires 27 arranged parallel to each other and to the circumferential direction of the rim indicated by the arrow 28.

It goes without saying that a reinforcement in accordance with the invention can be used in combination with one or more other reinforcements intended to reinforce the rim with respect to other stresses.

What is claimed is:

1. In a reinforced wheel rim of moldable material for a tire having a base with an upper face and a lower face and with a bead seat on each side extended by a flange, the improvement which comprises only the base has a tension-resistant embedded reinforcement solely formed by reinforcing elements arranged parallel to the circumferential direction of the rim.

2. The reinforced wheel rim defined by claim 1 wherein the rim has a sunken base formed of a cylindrical bottom portion and two sidewalls and at least the cylindrical bottom portion of the sunken base has said reinforcement.

3. The reinforced wheel rim defined by claim 1 wherein the rim has a flat base.